US008817733B2

(12) United States Patent
Niu et al.

(10) Patent No.: US 8,817,733 B2
(45) Date of Patent: Aug. 26, 2014

(54) MOBILE PROXY FOR CLOUD RADIO ACCESS NETWORK

(75) Inventors: Huaning Niu, Milpitas, CA (US); Geng Wu, Plano, TX (US); Hujun Yin, Saratoga, CA (US); Mo-Han Fong, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 76 days.

(21) Appl. No.: 13/587,759

(22) Filed: Aug. 16, 2012

(65) Prior Publication Data

US 2014/0050103 A1  Feb. 20, 2014

(51) Int. Cl.
*H04W 4/00* (2009.01)
*H04L 12/56* (2006.01)
*H04L 12/26* (2006.01)

(52) U.S. Cl.
CPC ............... *H04L 47/10* (2013.01); *H04L 43/08* (2013.01)
USPC ............................ 370/329; 370/252; 370/465

(58) Field of Classification Search
CPC ....... H04L 47/10; H04L 43/08; H04W 36/18; H04W 36/0011
USPC ......... 370/252, 328–329, 331–333, 352–356, 370/400–401, 437, 465, 469
See application file for complete search history.

(56) References Cited

U.S. PATENT DOCUMENTS

| | | | |
|---|---|---|---|
| 7,184,789 B2 | 2/2007 | Leung et al. | |
| 7,203,740 B1 * | 4/2007 | Putzolu et al. | 709/220 |
| 8,249,057 B1 * | 8/2012 | Mohaban et al. | 370/352 |
| 8,504,718 B2 * | 8/2013 | Wang et al. | 709/238 |
| 8,559,336 B2 * | 10/2013 | Calippe et al. | 370/254 |
| 8,606,911 B2 * | 12/2013 | Raleigh et al. | 709/224 |
| 2007/0297430 A1 * | 12/2007 | Nykanen et al. | 370/408 |
| 2008/0104134 A1 | 5/2008 | Chellappa et al. | |
| 2010/0299419 A1 * | 11/2010 | Ramankutty et al. | 709/221 |
| 2011/0083138 A1 * | 4/2011 | Sivasubramanian et al. | 719/328 |
| 2011/0188457 A1 * | 8/2011 | Shu et al. | 370/329 |
| 2011/0271007 A1 * | 11/2011 | Wang et al. | 709/238 |
| 2011/0277026 A1 * | 11/2011 | Agarwal et al. | 726/8 |
| 2011/0299537 A1 * | 12/2011 | Saraiya et al. | 370/392 |
| 2012/0087319 A1 * | 4/2012 | Raleigh et al. | 370/329 |
| 2013/0243075 A1 * | 9/2013 | Dalela et al. | 375/240.01 |
| 2014/0105139 A1 * | 4/2014 | Tomici et al. | 370/329 |

OTHER PUBLICATIONS

Vada, Harish "Cloud RAN, Radio-over-Fiber: Cloud paradigm for Wireless Networks", Sep. 29, 2011, http://www.telecom-cloud.net/cloud-ran-radio-over-fiber-cloud-paradigm-for-cellular-networks/.
International Search Report and Written Opinion mailed Oct. 1, 2013 from International Application No. PCT/US2013/048359.

* cited by examiner

*Primary Examiner* — Kevin Mew (74) *Attorney, Agent, or Firm* — Schwabe, Williamson & Wyatt, P.C.

(57) ABSTRACT

Embodiments of computer-implemented methods, systems, computing devices, and computer-readable media are described herein for monitoring, by a mobile proxy associated with a control system of a cloud radio access network ("C-RAN"), application layer data traffic between the control system and a wireless communication device. In various embodiments, the mobile proxy may, based on the monitoring, facilitate alteration of data plane or control plane processing by the wireless communication device or a remote radio head ("RRH") associated with the C-RAN.

23 Claims, 5 Drawing Sheets

TRANSITION A UE DEVICE FROM A FIRST STATE OF OPERATION TO A SECOND STATE OF OPERATION IN WHICH LESS SIGNALING IS USED TO REVERT FROM IDLE MODE TO CONNECTED MODE THAN IN THE FIRST STATE OF OPERATION
302

ALTER RRC SIGNALING BETWEEN THE UE DEVICE AND AN RRH
304

REFORMAT MEDIA CONTENT TO SUIT ONE OR MORE HARDWARE CAPABILITIES OF UE DEVICE
306

REDIRECT UE DEVICE FROM GENERAL VERSION OF NETWORK RESOURCE TO MOBILE-ENHANCED VERSION
308

INCORPORATE DATA COMPRESSION INTO DATA PLANE PROCESSING
310

MODIFY TRAFFIC FLOW TO UTILIZE ONE OR MORE DATA CACHES AVAILABLE BETWEEN UE DEVICE AND A NETWORK RESOURCE BEING ACCESSED BY UE DEVICE
312

MOBILE PROXY FOR CLOUD RADIO ACCESS NETWORK

FIELD

Embodiments of the present invention relate generally to the technical field of data processing, and more particularly, to a mobile proxy for a cloud radio access network ("C-RAN").

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

A conventional wireless wide area network ("WWAN") may include a plurality of radio network access nodes. For example, a Third Generation Partnership Project ("3GPP") Long Term Evolution ("LTE") WWAN may include a plurality of evolved Node Bs ("eNBs"). Each eNB may provide a cell to which a plurality of user equipment ("UE") devices may wirelessly connect. Collectively, the cells provided by the eNBs (as well as other radio network access nodes such as femto cells) may form a radio access network ("RAN"). In the case of LTE, the RAN may be referred to as an Evolved Universal Terrestrial Radio Access Network, or "E-UTRAN," and may interface with an Evolved Packet Core, or "EPC." eNBs of an E-UTRAN may be in communication with various EPC nodes, such as a mobility management entity ("MME") and a serving gateway ("S-GW"). The MME may perform a variety of control functions, such as non-access stratum ("NAS") signaling, idle-mode UE reachability and S-GW assignment. The S-GW may, among other things, route user data packets and act as a local mobility anchor for inter-eNB handover.

A cloud RAN, or "C-RAN," may operate in a more centralized manner than a traditional WWAN to provide WWAN infrastructure to a plurality of wireless communication devices, such as UE devices. A C-RAN may include a baseband processing pool ("BBU") to which a plurality of remote radio heads ("RRHs") may be connected. The BBU may include one or more computing systems configured to perform various control functions that in a traditional WWAN may be controlled by eNBs, MMEs and S-GWs. In some cases, the BBU may include a server farm. Each RRH may provide a cell to which a plurality of UE devices may connect. The cells provided by a plurality of RRHs may collectively form a RAN. In some cases, RRHs may be connected to the BBU via high-bandwidth/low latency means, such as via optical transport. A C-RAN may provide higher spectral efficiency and/or better data services to end users than a traditional WWAN.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
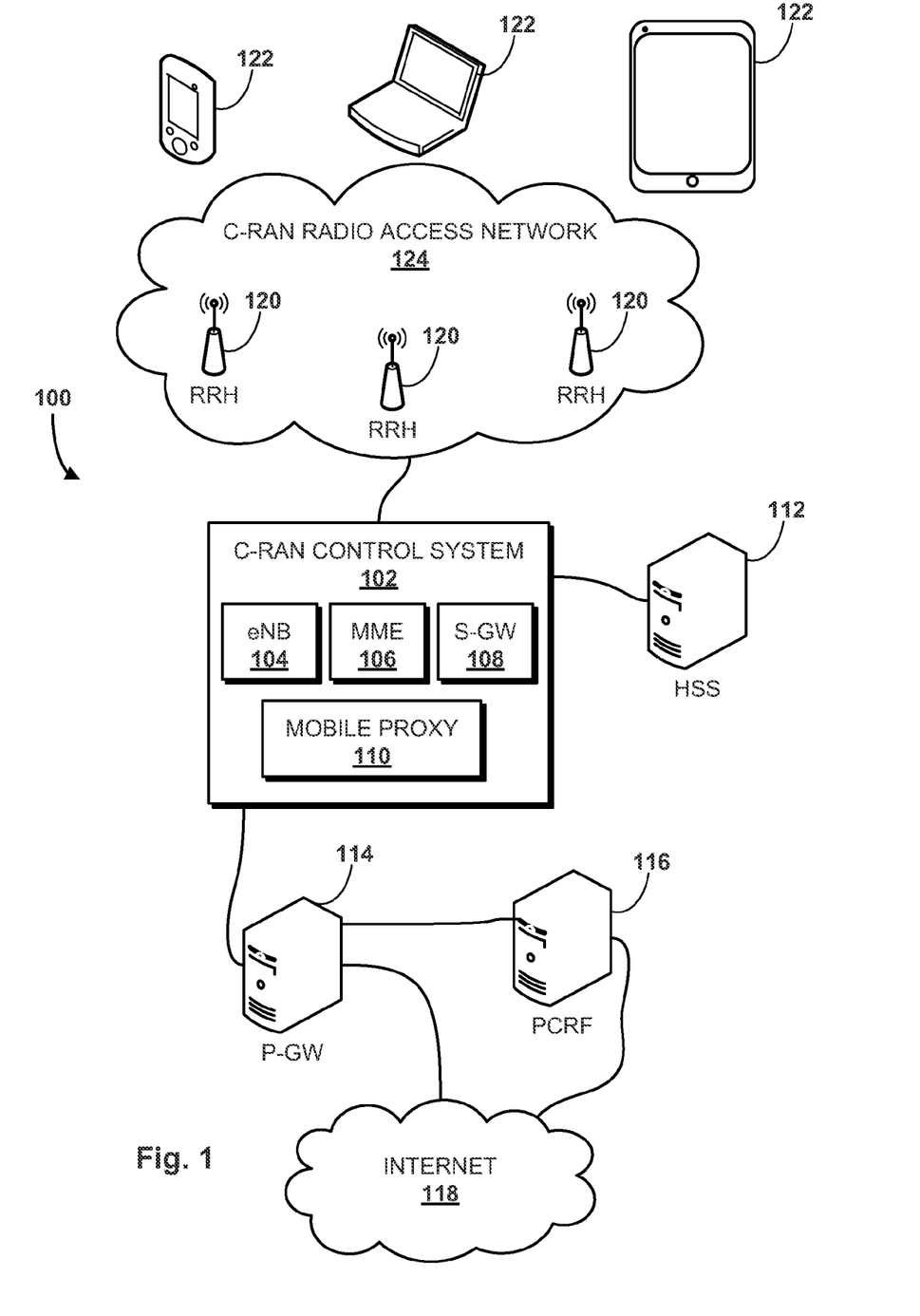
FIG. 1 schematically illustrates an example cloud radio access network ("C-RAN") architecture that includes, among other things, a mobile proxy, in accordance with various embodiments.

Referring now to FIG. 1, a cloud radio access network ("C-RAN") architecture 100 may be controlled by a control system 102, which may alternatively be referred to as a baseband processing pool ("BBU"). As noted in the background, control system 102 may include any number of computing devices, which in some cases may together form a server farm. Control system 102 may include various modules configured to perform various functions. These modules may be implemented using any combination of hardware and/or software. For instance, control system 102 may include modules 104, 106 and 108 that perform functions that, in a traditional wireless wide area network ("WWAN"), may be performed by an evolved Node B ("eNB"), a mobility management entity ("MME"), and a serving gateway ("S-GW"), respectively. Control system 102 may also include a mobile proxy 110.

C-RAN architecture 100 may include and/or interact with other components. For example, a home subscriber server ("HSS") 112 may store various subscriber data and may perform functions such as user authentication, access authorization, mobility management, and call/session establishment support. A public domain network gateway ("P-GW") 114 may perform, among other things, per-user packet filtering, user equipment ("UE") Internet Protocol ("IP") address allocation and transport-level packet marking for downlinking. A policy and charging rules function ("PCRF") node 116 may determine policy rules. P-GW 114 and PCRF node 116 may be connected to one or more local and/or wide area networks, such as the Internet 118.

C-RAN architecture 100 may include a plurality of remote radio heads ("RRHs") 120. Each RRH 120 may provide a cell to which one or more UE devices 122 may connect. Combined, the cells provided by the one or more RRHs 120 may form a radio access network ("RAN") 124. In FIG. 1, the UE devices 122 include a smart phone, a laptop computer and a computing tablet, but this is not meant to be limiting, and any other type of wireless communication device may function as a UE device 122 as described herein.

In various embodiments, mobile proxy 110 may be configured to obtain and/or collect information, both directly from various nodes and from monitoring interactions between various nodes. Based on this information, mobile proxy 110 may perform cross layer alteration of control and/or data planes, e.g., to improve performance of UE devices 122, RRHs 120, or any other network node.

Figure 2:
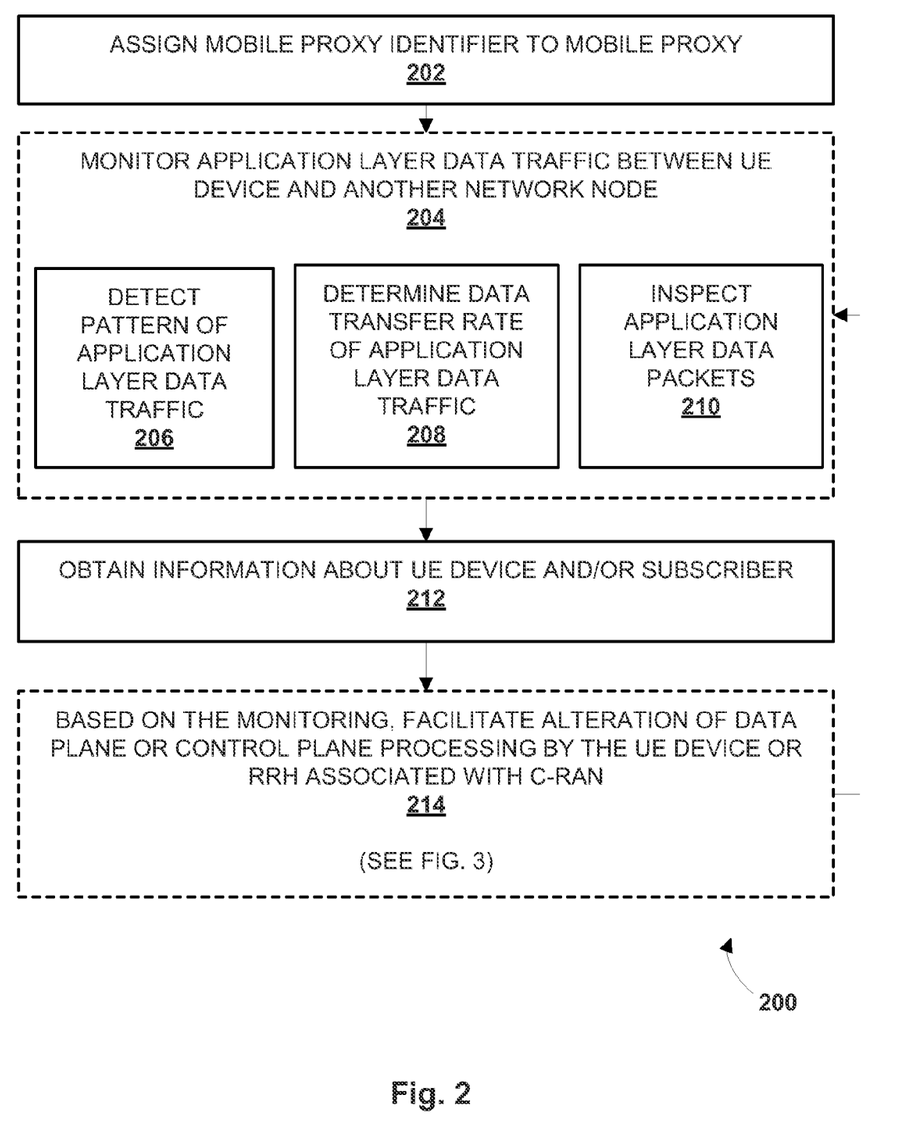
FIG. 2 schematically illustrates an example method that may be implemented by a C-RAN control system and/or a mobile proxy executing thereon, in accordance with various embodiments.

FIG. 2 depicts an example method 200 that may be implemented by C-RAN control system 102 in FIG. 1, e.g., via mobile proxy 110, in accordance with various embodiments. At block 202, a mobile proxy identifier may be assigned, e.g., by C-RAN control system 102, to a mobile proxy such as mobile proxy 110. A mobile proxy identifier may take various forms. In embodiments where each RRH 120 is only connected to a single C-RAN control system 102, mobile proxy 110 may be identified by a combination of a public land mobile network ("PLMN") identifier and a mobility management entity ("MME") group identifier ("MMEGI"). For example, the PLMN identifier and MMEGI may be concatenated to form a mobile proxy identifier. In alternative embodiments, a tracking area code ("TAC") may be used instead of the MMEGI in combination with the PLMN identifier, particularly where a tracking area corresponds to coverage provided by a single C-RAN. In yet other embodiments, a C-RAN identifier may be used in combination with the PLMN identifier to identify the mobile proxy. In various embodiments, a UE device (e.g., 122) may be identified to mobile proxy 110 using an International Mobile Station Equipment Identifier ("IMEI") or an International Mobile Subscriber Identifier ("IMSI").

At block 204, application layer data traffic between a network node—e.g., C-RAN control system 102, RRH 120 and/or a network resource (not shown)—and a wireless communication device (e.g., UE device 122) may be monitored, e.g., by mobile proxy 110. As indicated by the dashed lines in FIG. 2, mobile proxy 110 may monitor for a variety of events, traffic characteristics and/or patterns.

For example, at block 206, a particular pattern of application layer data traffic may be detected, e.g., by mobile proxy 110. For instance, mobile proxy 110 may detect a traffic pattern that is consistent with UE device 122 streaming music from a streaming music source (not shown). In many cases, streaming music may be downloaded more quickly than it is played back. Thus, a traffic pattern of streaming music may include periodic periods of downloading separated by periods where no data is downloaded. In various cases, the wireless communication device may render the streaming music to a user during the periods where no data is downloaded. Other types of traffic patterns consistent with other types of applications, such as streaming video, data exchange, and so forth, may additionally or alternatively be detected.

As another example, at block 208, a data transfer rate of application layer data traffic between a wireless communication device and a network node may be determined, e.g., by mobile proxy 110. As will be discussed below, the data transfer rate may be used to make various types of decisions, such as whether to perform data compression (e.g., when the rate is relatively slow).

As another example, at block 210, application layer data packets may be inspected, e.g., by mobile proxy 110, to ascertain various information. For instance, the mobile proxy may perform this "deep packet inspection" to determine what application is being used by UE device 122, a size of data being exchanged, information about hardware capabilities of UE device 122, and so forth.

At block 212, information about UE device 122 and/or a subscriber that is using UE device 122 may be obtained, e.g., by mobile proxy 110. Mobile proxy 110 may obtain subscriber information from various sources, such as HSS 112. Subscriber information may include but is not limited to subscriber access rights and so forth. Mobile proxy 110 may similarly obtain device information from various sources, such as HSS 112, or from UE device 122 itself. Device information may include but is not limited to one or more hardware capabilities of UE devices, such as its screen size and/or resolution.

Based on the monitoring at block 204 and/or the subscriber/device information obtained at block 212, at block 214, mobile proxy 110 may facilitate alteration of a control plane or data plane between UE device 122 and RRH 120 and/or C-RAN control system 102. For example, mobile proxy 110 may issue one or more instructions to UE device 122 or RRH 120 to alter (e.g., optimize) a control plane or data plane processing between them or another network node, such as C-RAN control system 102.

Figure 3:
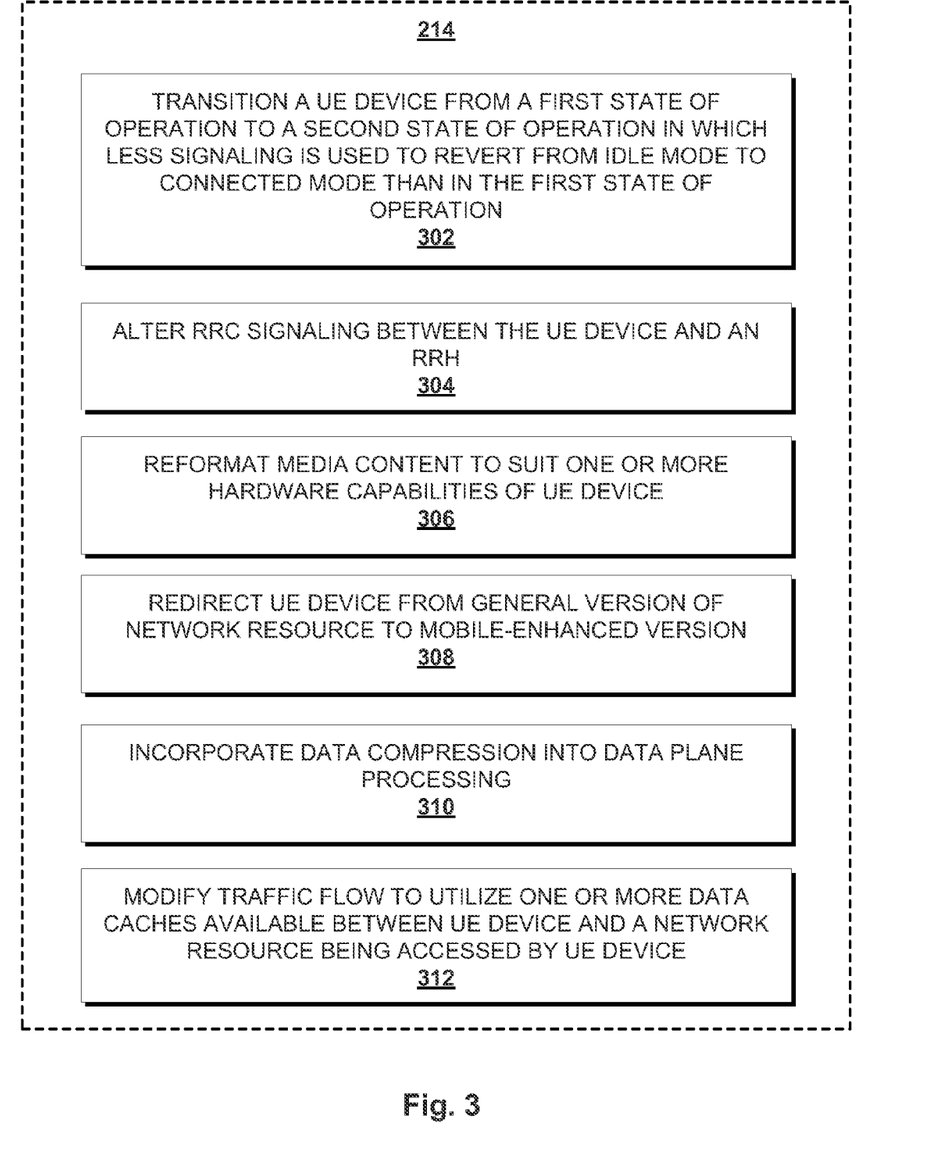
FIG. 3 schematically depicts example data/control plane alterations that may be implemented by various network nodes, in accordance with various embodiments.

As indicated by the dashed outline, block 214 may include a variety of operations that may be performed by various network nodes, such as UE device 122 and/or RRH 120, to alter (e.g., optimize) data and/or control plane processing. Some non-limiting example operations are shown in FIG. 3. For instance, at block 302, UE device 122 may, e.g., in response to an instruction from mobile proxy 110, transition from a first state of operation to a second state of operation. In various embodiments, less signaling may be used to revert the wireless communication device from an idle mode to a connected mode when UE device 122 is in the second state of operation than when UE device 122 is in the first state of operation. In various embodiments, the idle mode may be radio resource control ("RRC") idle and the connected mode may be RRC connected. In various embodiments, the second state of operation may be a discontinuous reception ("DRX") state of operation. In the DRX state of operation, UE device 122 may match a DRX cycle with a particular traffic pattern. This may result in UE device 122 using less RRC signaling than if UE device 122 were to periodically enter into RRC idle mode in between downloads.

As another example of altering a data or control plane, at block 304, RRC signaling between UE device 122 and, e.g., RRH 120, may be altered, e.g., to reduce signaling overhead, to improve handover between RRHs, to perform traffic load balancing, and so forth. This may achieve effects similar to transitioning the UE device 122 to another mode of operation to reduce signaling used.

As another example of altering data or control plane processing, at block 306, media content may be reformatted, e.g., by mobile proxy 110, to suit one or more hardware capabilities of the wireless communication device. For instance, in various embodiments, mobile proxy 110 may reformat video data destined for UE device 122 to comport with a screen resolution or a screen size of UE device 122.

As another example of altering data or control plane processing, at block 308, UE device 122 may be redirected, e.g., by mobile proxy 110, from accessing a general version of a network resource to accessing a mobile-enhanced version of the network resource. For instance, there may be general and mobile-enhanced versions of a particular website. The general version of the website may include more information and/or multimedia content (e.g., graphics, video, etc.) than the mobile-enhanced version. The mobile-enhanced version may be paired down so that it requires less data transfer and/or is more easily viewable on a smaller display of a typical UE device.

As another example of altering data or control plane processing, at block 310, data compression such as Hypertext Transport Protocol ("HTTP") compression may be incorporated, e.g., by mobile proxy 110, into data plane processing. In some embodiments, mobile proxy 110 itself may perform data compression on data before transferring the data to/from UE device 122. In some embodiments, mobile proxy 110 may instruct other network nodes, such as UE device 122, RRH 120, or another intermediate network node, to perform the data compression.

As another example of altering data or control plane processing, at block 312, traffic flow may be modified, e.g., by mobile proxy 110, to utilize one or more data caches available in between UE device 110 and a network resource (not shown) that is being accessed by the wireless communication device. For example, streaming data may be cached at one or more intermediate network locations, or even at UE device 122 itself, to enhance efficiency of delivery of the data to UE device 122 under a variety of circumstances.

In another aspect, UE handovers may be handled by mobile proxies operating in association with C-RAN architectures (e.g., 100) in various ways. For example, as a UE device passes from one RRH to another, so long as the RRHs are part of the same C-RAN, the UE device may continue to interact with the same mobile proxy. However, a mobile proxy used by a UE device may change if the UE device passes from one C-RAN to another.

Figure 4:
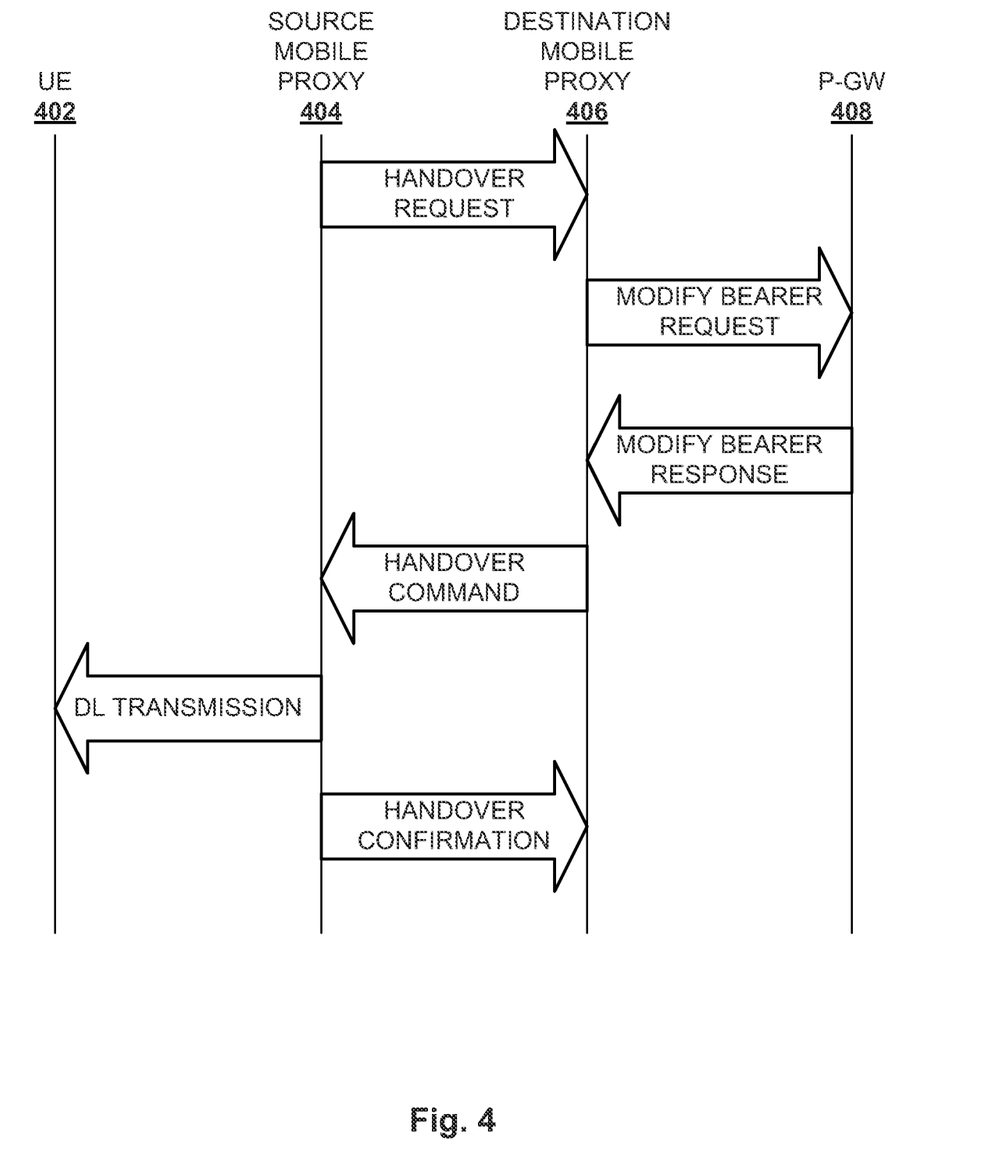
FIG. 4 schematically illustrates example information exchanges between various entities during a C-RAN handover, in accordance with various embodiments.

FIG. 4 schematically depicts example exchanges that may be implemented by a mobile proxy, such as mobile proxy 110 in FIG. 1, to handover a UE device 402 between C-RANs, in accordance with various embodiments. In this example, assume a UE device 402 is being handed over from a source mobile proxy 404 associated with a first C-RAN (not shown) to a destination mobile proxy 406 associated with a second C-RAN (also not shown). This decision may be made, e.g., responsive to a determination that UE device 402 would be better served by an RRH (not shown) associated with the second C-RAN.

The handover may begin with source mobile proxy 404 transmitting a handover request to destination mobile proxy 406. Upon receiving the handover request, destination mobile proxy 406 may transmit a request to a P-GW 408 to modify a bearer. In various embodiments, communications between mobile proxies (e.g., 404, 406) and P-GW 408 may be transmitted over an S5/S8 interface. In various embodiments, these communications may be transmitted using, e.g., the General Packet Radio Service ("GPRS") Tunneling Protocol ("GTP") or the Proxy Mobile Internet Protocol ("PMIP"). P-GW 408 may respond to the modify bearer request by transmitting a response to destination mobile proxy 406 to modify the bearer. Destination mobile proxy 406 may then transmit a handover command to source mobile proxy 404. Source mobile proxy 404 may send a downlink transmission to UE device 402. Source mobile proxy 404 may then transmit, to destination mobile proxy 406, a handover confirmation.

Figure 5:
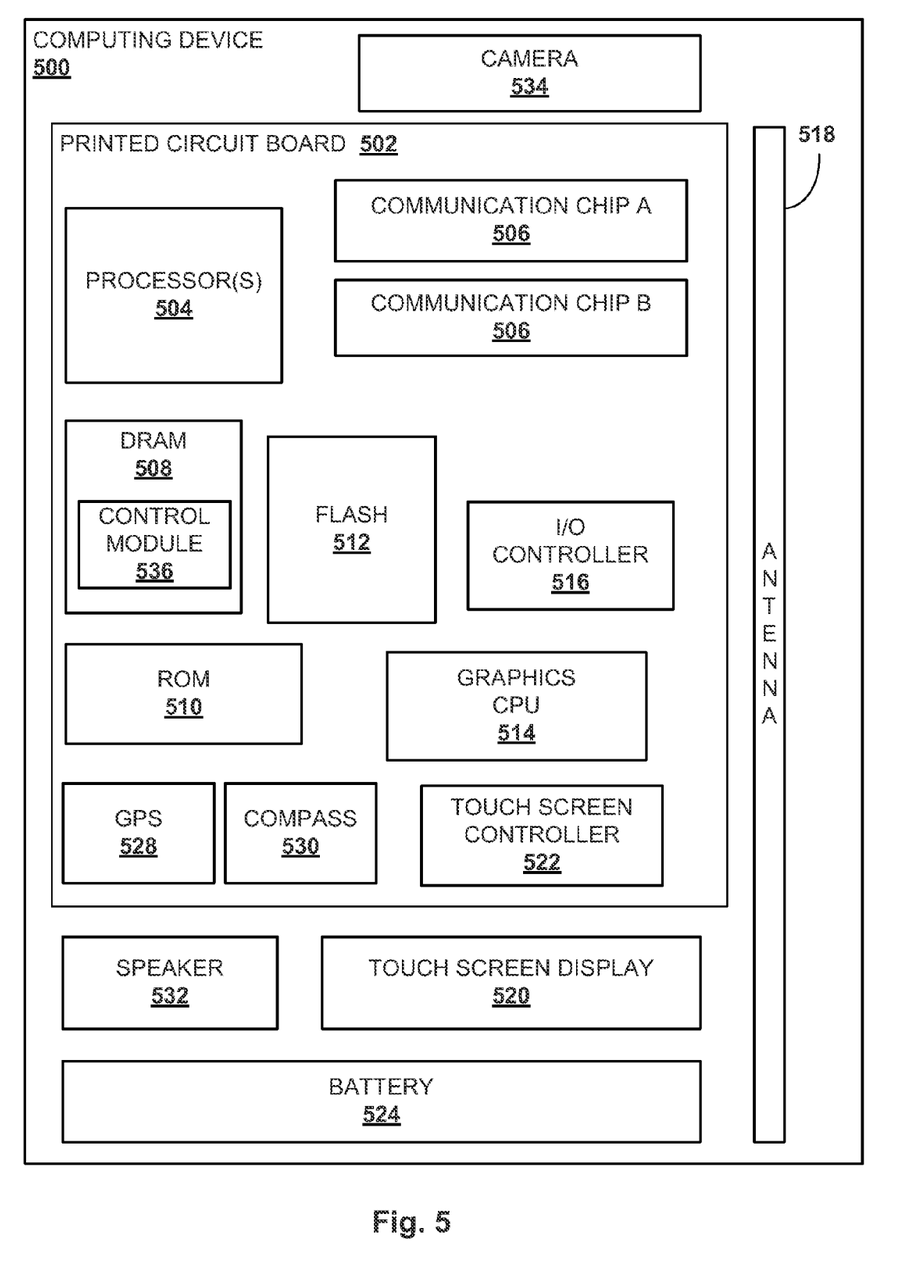
FIG. 5 schematically depicts an example computing device on which disclosed methods and computer-readable media may be implemented, in accordance with various embodiments.

FIG. 5 illustrates an example computing device 500, in accordance with various embodiments. Computing device 500 may include a number of components, a processor 504 and at least one communication chip 506. In various embodiments, the processor 504 may be a processor core. In various embodiments, the at least one communication chip 506 may also be physically and electrically coupled to the processor 504. In further implementations, the communication chip 506 may be part of the processor 504. In various embodiments, computing device 500 may include a printed circuit board ("PCB") 502. For these embodiments, processor 504 and communication chip 506 may be disposed thereon. In alternate embodiments, the various components may be coupled without the employment of PCB 502.

Depending on its applications, computing device 500 may include other components that may or may not be physically and electrically coupled to the PCB 502. These other components include, but are not limited to, volatile memory (e.g., dynamic random access memory 508, also referred to as "DRAM"), non-volatile memory (e.g., read only memory 510, also referred to as "ROM"), flash memory 512, a graphics processor 514, an input/output controller 516, a digital signal processor (not shown), a crypto processor (not shown), one or more antenna 518, a display (not shown), a touch screen display 520, a touch screen controller 522, a battery 524, an audio codec (not shown), a video codec (not shown), a global positioning system ("GPS") device 528, a compass 530, an accelerometer (not shown), a gyroscope (not shown), a speaker 532, a camera 534, and a mass storage device (such as hard disk drive, a solid state drive, compact disk ("CD"), digital versatile disk ("DVD")) (not shown), and so forth. In various embodiments, the processor 504 may be integrated on the same die with other components to form a System on Chip ("SoC").

In various embodiments, volatile memory (e.g., DRAM 508), non-volatile memory (e.g., ROM 510), flash memory 512, and the mass storage device may include programming instructions configured to enable computing device 500, in response to execution by processor(s) 504, to practice all or selected aspects of method 200, including the operations shown in FIG. 3, and/or some or all operations shown in FIG. 4. For example, one or more of the memory components such as volatile memory (e.g., DRAM 508), non-volatile memory (e.g., ROM 510), flash memory 512, and the mass storage device may include temporal and/or persistent copies of instructions that, when executed, enable computing device 500 to operate a control module 536 configured to practice all or selected aspects of method 200, including the operations shown in FIG. 3, and/or some or all operations shown in FIG. 4.

The communication chips 506 may enable wired and/or wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond. The computing device 500 may include a plurality of communication chips 506. For instance, a first communication chip 506 may be dedicated to shorter range wireless communications such as Wi-Fi and Bluetooth and a second communication chip 506 may be dedicated to longer range wireless communications such as GPS, EDGE, GPRS, CDMA, WiMAX, LTE, Ev-DO, and others.

In various implementations, the computing device 500 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 500 may be any other electronic device that processes data.

Embodiments of apparatus, packages, computer-implemented methods, systems, devices, and computer-readable media (transitory and non-transitory) are described herein for monitoring, e.g., by a mobile proxy associated with a control system of a C-RAN, application layer data traffic between the control system and a wireless communication device. In various embodiments, based on the monitoring, the mobile proxy may facilitate alteration of data plane or control plane processing by the wireless communication device or an RRH associated with the C-RAN.

In various embodiments, the facilitating may include instructing, by the mobile proxy, the wireless communication device to transition from a first state of operation to a second state of operation. In various embodiments, less signaling may be used to revert the wireless communication device from an idle mode to a connected mode in the second state of operation than in the first state of operation. In various embodiments, the idle mode may be RRC idle, and the connected mode may be RRC connected. In various embodiments, the second state of operation may be a DRX state of operation. In various embodiments, the facilitating may be based on subscriber information about a user of the wireless communication device. In various embodiments, the subscriber information may be obtained from an HSS.

In various embodiments, the monitoring may include detecting a pattern of the application layer data traffic between the control system and the wireless communication device. In various embodiments, the monitoring may include determining a data transfer rate between the control system and the wireless communication device. In various embodiments, the monitoring may include inspecting data packets passed between the wireless communication device and the control system to identify an application.

In various embodiments, the application layer data traffic between the control system and the wireless communication device may include a media content. In various embodiments, the alteration may include reformatting the media content to suit a hardware capability of the wireless communication device. In various embodiments, the hardware capability of the wireless communication device may be a screen resolution or a screen size.

In various embodiments, the alteration may include redirection of the wireless communication device from accessing a general version of a network resource to accessing a mobile-enhanced version of the network resource, such as a web page optimized for mobile devices. In various embodiments, the alteration may include incorporation of HTTP compression into the data plane processing. In various embodiments, the alteration may include alteration of RRC signaling between the wireless communication device and the RRH. In various embodiments, the alteration may include modification of traffic flow between the wireless communication device and a remote network resource to utilize one or more data caches available in between the wireless communication device and the remote network resource.

In various embodiments, a mobile proxy identifier may be assigned, e.g., by the control system to the mobile proxy. In various embodiments, the mobile proxy identifier may include a combination of two or more identifiers selected from a group consisting of a PLMN identifier, a MME group ID, a TAC, and a C-RAN identifier.

In various embodiments, e.g., responsive to a determination that a wireless communication device would be better served by an RRH associated with a remote C-RAN, a mobile proxy may transmit, to a remote mobile proxy associated with the remote C-RAN, a request to handover the wireless communication device to the remote mobile proxy. Likewise, in various embodiments, the mobile proxy may receive, from a remote mobile proxy associated with a remote C-RAN, a request to handover another wireless communication device to the mobile proxy. In response, the mobile proxy may transmit, to a public domain network gateway, a modify bearer request, receive, from the public domain network gateway, a modify bearer response, and transmit, to the remote mobile proxy, a command to handover the another wireless communication device.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The invention claimed is:

1. A control system of a cloud radio access network ("C-RAN"), comprising:
   a processor;
   a memory operably coupled to the processor; and
   instructions stored in the memory that, in response to execution by the processor, enable the processor to operate a mobile proxy configured to:
   determine a characteristic of application-level processing of a wireless communication device connected to the C-RAN; and
   based on the determined characteristic, facilitate alteration of data plane or control plane processing by the wireless communication device or a remote radio head ("RRH") associated with the C-RAN.

2. The control system of claim 1, wherein the facilitation comprises transmission of an instruction to the wireless communication device to transition from a first state of operation to a second state of operation, wherein less signaling is used to revert the wireless communication device from an idle mode to a connected mode in the second state of operation than in the first state of operation.

3. The control system of claim 1, wherein the characteristic is a pattern of the application layer data traffic between the control system and the wireless communication device or a data field in a data packet passed between the wireless communication device and the control system.

4. The control system of claim 1, wherein the instructions, in response to execution by the processor, further enable the processor to operate the mobile proxy to transmit, to a remote mobile proxy associated with a remote C-RAN, a request to handover the wireless communication device to the remote mobile proxy, responsive to a determination that the wireless communication device would be better served by an RRH associated with the remote C-RAN.

5. The control system of claim 1, wherein the instructions, in response to execution by the processor, further enable the processor to operate the mobile proxy to:
   receive, from a remote mobile proxy associated with a remote C-RAN, a request to handover another wireless communication device to the mobile proxy;
   transmit, to a public domain network gateway, a modify bearer request;
   receive, from the public domain network gateway, a modify bearer response; and
   transmit, to the remote mobile proxy, a command to handover the another wireless communication device.

6. The control system of claim 1, further comprising an antenna.

7. At least one non-transitory computer-readable medium comprising instructions that, in response to execution of the instructions by a control system of a cloud radio access network ("C-RAN"), enable the control system to operate a mobile proxy configured to:
   monitor application layer data traffic between the control system and a wireless communication device;
   detect a pattern of the application layer data traffic between the control system and the wireless communication device; and
   facilitate alteration of data plane or control plane processing by the wireless communication device or a remote radio head ("RRH") associated with the C-RAN based on the detected pattern.

8. The at least one non-transitory computer-readable medium of claim 7, wherein the mobile proxy is further configured to direct the wireless communication device to transition from a first state of operation to a second state of operation, wherein less signaling is used to revert the wireless communication device from an idle mode to a connected mode in the second state of operation than in the first state of operation.

9. The at least one non-transitory computer-readable medium of claim 8, wherein the idle mode is radio resource control ("RRC") idle, and the connected mode is RRC connected.

10. The at least one non-transitory computer-readable medium of claim 8, wherein the second state of operation is a discontinuous reception ("DRX") state of operation.

11. The at least one non-transitory computer-readable medium of claim 7, wherein the mobile proxy is further configured to determine a data transfer rate between the control system and the wireless communication device.

12. The at least one non-transitory computer-readable medium of claim 7, wherein the mobile proxy is further configured to inspect data packets passed between the wireless communication device and the control system to identify an application.

13. The at least one non-transitory computer-readable medium of claim 7, wherein the application layer data traffic between the control system and the wireless communication device comprises a media content, and wherein the mobile proxy is further configured to reformat the media content to suit a hardware capability of the wireless communication device.

14. The at least one non-transitory computer-readable medium of claim 13, wherein the hardware capability of the wireless communication device comprises a screen resolution or a screen size.

15. The at least one non-transitory computer-readable medium of claim 7, wherein the mobile proxy is further configured to redirect the wireless communication device from a general version of a network resource to a mobile-enhanced version of the network resource.

16. The at least one non-transitory computer-readable medium of claim 7, wherein the mobile proxy is further configured to incorporate hypertext transport protocol ("HTTP") compression into the data plane processing.

17. The at least one non-transitory computer-readable medium of claim 7, wherein the alteration includes alteration of radio resource control ("RRC") signaling between the wireless communication device and the RRH.

18. The at least one non-transitory computer-readable medium of claim 7, wherein the instructions, in response to execution of the instructions by the control system, cause the control system to assign, to the mobile proxy, a mobile proxy identifier comprising a combination of two or more identifiers selected from a group consisting of a public land mobile network ("PLMN") identifier, a mobility management entity ("MME") group ID, a tracking area code ("TAC") and a C-RAN identifier.

19. The at least one non-transitory computer-readable medium of claim 7, wherein the mobile proxy is further configured to modify traffic flow between the wireless communication device and a remote network resource to utilize one or more data caches available in between the wireless communication device and the remote network resource.

20. The at least one non-transitory computer-readable medium of claim 7, wherein the facilitating is further based on subscriber information about a user of the wireless communication device.

21. The at least one non-transitory computer-readable medium of claim 20, wherein the mobile proxy is further configured to obtain the subscriber information from a home subscriber server.

22. A computer-implemented method, comprising:
providing, by a wireless communication device to a mobile proxy associated with a control system of a cloud radio access network ("C-RAN"), information about the wireless communication device;
providing, by the wireless communication device to the mobile proxy, an indication that the wireless communication device will coordinate with the mobile proxy; and
altering, by the wireless communication device, data or control plane processing of the wireless communication device responsive to an instruction from the mobile proxy, wherein the instruction is generated based at least in part on the information about the wireless communication device.

23. The computer-implemented method of claim 22, wherein the information about the wireless communication device includes a screen size or screen resolution of the wireless communication device.

\* \* \* \* \*